United States Patent
Schaty et al.

(10) Patent No.: US 6,241,442 B1
(45) Date of Patent: Jun. 5, 2001

(54) FASTENING MEANS FOR FORMING A WELDED JOINT BETWEEN A FASTENING MEANS AND A STRUCTURE

(75) Inventors: Harald Schaty, Wetzlar-Dutenhofen; Dieter Mauer, Lollar, both of (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/455,358

(22) Filed: Dec. 6, 1999

Related U.S. Application Data

(62) Division of application No. 09/106,055, filed on Jun. 26, 1998, now Pat. No. 5,998,756.

(30) Foreign Application Priority Data

Jun. 27, 1997 (DE) .............................. 197 27 411

(51) Int. Cl.[7] .......................... F16B 37/06; F16B 39/284
(52) U.S. Cl. .......................... 411/171; 411/324; 411/437; 219/98
(58) Field of Search .................................. 411/171, 433, 411/437, 324; 219/93, 98, 99, 117.1

(56) References Cited

U.S. PATENT DOCUMENTS

| | | | |
|---|---|---|---|
| 1,982,098 | * 11/1934 | Hartmann | 219/98 |
| 3,435,871 | * 4/1969 | Johnson | 219/99 |
| 4,799,842 | * 1/1989 | Kreider et al. | 411/171 |
| 5,105,060 | * 4/1992 | Tanaka et al. | 219/117.1 |
| 5,253,966 | * 10/1993 | Clements et al. | 411/399 |
| 5,508,488 | * 4/1996 | Aoyama et al. | 219/93 |
| 5,820,323 | * 10/1998 | Barandun | 411/171 |

FOREIGN PATENT DOCUMENTS

| | | |
|---|---|---|
| 2185472 | 1/1974 | (FR) . |
| 2238560 | 2/1975 | (FR) . |
| 2283293 | 5/1995 | (GB) . |
| 9403735 | 2/1994 | (WO) . |

* cited by examiner

*Primary Examiner*—Neill Wilson
(74) *Attorney, Agent, or Firm*—Edward D. Murphy

(57) ABSTRACT

To form a welded joint between a fastening means (1) and a structure (2), a fastening means (1) with a holder (3) and a connecting element (4) is proposed. The holder (3) essentially consists of an electrically insulating material. The connecting element (4) consists of a substantially electrically conductive material. The holder (3) substantially surrounds the connecting element (4). The connecting element (4) has a contact face (5) located inside the holder (3). The holder (3) has a through-orifice (6) at least partially overlapping the contact face (5). A contact piece (7) of an electrically operated welding device is introduced through the through-orifice (6).

17 Claims, 3 Drawing Sheets

FASTENING MEANS FOR FORMING A WELDED JOINT BETWEEN A FASTENING MEANS AND A STRUCTURE

This application is a division of application Ser. No. 09/106,055, filed Jun. 26, 1998, now U.S. Pat. No. 5,998,756.

BACKGROUND OF THE INVENTION

The present invention relates to a fastening means for forming a welded joint between a fastening means and a structure.

For fastening components to a metallic structure, for example, a body of a motor vehicle, fastening means are known which are welded to the metallic structure. Known fastening means comprise a holder and a connecting element. The connecting element can be a weld stud, in particular a Christmas tree stud, which is welded to the structure. A connecting element which can be welded to a component by electric arc welding is known from WO 94/03735. The connecting element is designed in the form of a resilient tube and has a longitudinal slot.

To achieve a high degree of automation, it is known to connect the connecting element to the structure by electric arc welding or resistance welding. Electric arc welding is usually carried out by the lift and strike method.

A holder which consists mainly of a substantially electrically insulating material, in particular a plastic material, is arranged on the connecting element welded to a structure. The holder which can be, for example, a line holder, is hammered or screwed onto the connecting element.

The costs of fitting a fastening element with a welded joint to a structure are relatively high. This problem has already been acknowledged. JP-A1 61-133266 proposes the use of a fastening means in which the holder is connected to the connecting element before a welded joint is formed. The holder, which consists of a substantially electrically insulating material, surrounds a connecting element consisting of a substantially electrically conductive material and having at least one contact face for making electrical contact. In particular, JP-A1 61-133266 proposes that the connecting element, which is designed in the form of a stud, should project from the holder. This creates a sufficiently large electrical contact face. However, the sphere of application of such a fastening means is restricted. The fastening means is used, in particular, for mounting fastening strips which cover the connecting element projecting from the holder.

JP-A1 61-133266 also discloses a fastening means in which the electrical contact face is formed by a projecting peripheral flange formed on the connecting element. To achieve contact between the connecting element and a contact piece of a welding device, the contact piece is tubular in design. To ensure that the tubular contact piece can be brought into electrical contact with the peripheral flange of the connecting element, it is necessary to design the flange so that it projects laterally beyond the holder. For this purpose, it is known to form the holder from a plastics material with a base body and with at least one holding element which is pivotal round an axis formed on the base body from a basic position into a locked position. However, a holder of this type is only suitable for fixing, for example, insulating mats on a body of a motor vehicle.

BRIEF SUMMARY OF THE INVENTION

It is an object of the present invention to provide a method of forming a welded joint which can also be carried out with fastening means having holders of different configurations, in particular holders having no peripheral flange. It is a further object of the invention to provide a fastening means which is constructionally simple in design and is suitable for carrying out a method for forming a welded joint.

The present invention provides a method of forming a welded joint between a fastening means and a structure, in which the fastening means, with a holder consisting of a substantially electrically insulating material which substantially surrounds a connecting element consisting of a substantially electrically conductive material and having at least one contact face for making electrical contact, wherein the holder has at least one through-orifice at least partially overlapping, or aligned with the at least one contact face of the connecting element formed within the holder, is held by a welding device and a contact piece of the welding device is brought into electrical contact with the contact face of the connecting element through the through-orifice of the holder and a welding current is switched on.

The present invention further provides a fastening means, for forming a welded joint with a holder which consists of a substantially electrically insulating material and a connecting element which consists of a substantially electrically conducting material, wherein the holder substantially surrounds the connecting element and the connecting element has at least one contact face for making electrical contact, characterised in that the holder has at least one through-orifice at least partially overlapping the at least one contact face of the connecting element formed inside the holder, wherein the connecting element is formed substantially in the form of a hollow cylinder at least in a region adjacent to the contact face.

With the method according to the invention for forming a welded joint between a fastening means and a structure, it is proposed that the fastening means be held by a welding device and a contact piece of the welding device be brought into contact with a contact face of the connecting element. The contact piece is brought into contact with the contact face of the connecting element through a through-orifice in the holder which consists of a substantially electrically insulating material and surrounds the connecting element. A welding current can be switched on once the contact piece has been brought through the through-orifice in the holder into electrical contact with the contact face of the connecting element. This process control enables fastening means already having a holder which is prefitted on the connecting element and can have various configurations to be obtained. This design also allows improved introduction of a welding current as the contact face can be sufficiently large in design. A further advantage of this process control is that the process according to the invention can be carried out using conventional welding devices.

It is proposed, in particular, that the welded joint be formed by the electric arc welding process. In particular, the welded joint can be formed by the lift and strike process.

Since the contact piece is brought into electrical contact with the contact face of the connecting element through the passage in the holder and a welding current is switched on, this method is also suitable for forming a welded joint by the resistance welding process, as a relatively large force can be introduced into the connecting element through the contact face.

According to a further feature of the invention, a fastening means is proposed, in particular for forming a welded joint according to the invention, which comprises a holder consisting of a substantially electrically insulating material and a connecting element consisting of a substantially electrically conductive material, wherein the holder substantially surrounds the connecting element and the connecting element has at least one contact face for making electrical contact. The holder is designed such that it has at least one through-orifice at least partially overlapping the at least one contact face of the connecting element formed within the holder. This through-orifice enables the contact face to be brought into contact with a contact piece of a welding device. The external configuration of the holder does not obstruct contact. The connecting element is designed such that the contact face is located within the connecting element. The connecting element is designed in the form of a hollow cylinder, at least in a region adjacent to the contact face.

According to an advantageous development of the fastening means, it is proposed that the connecting element be cylindrical in design. In particular, the connecting element can be designed in the form of a stud, preferably in the form of a Christmas tree stud. The connecting element can also have a design of the type known from WO 94/03735. This connecting element is designed in the form of a tube. The contact face is located within the connecting element. It is not essential for the connecting element to consist of a continuous tube, in particular a slotted tube, as known from WO 94/03735.

The holder preferably consists of a plastic material. If this is the case, it is proposed according to an advantageous development of the fastening means that the holder be injection molded on the connecting element so the fastening means may be treated as a single piece for handling and stocking purposes.

To simplify removal of the holder, it is proposed that the holder be detachably connected to the connecting element. The holder is preferably connected in a frictional and/or interlocking manner to the connecting element.

According to a further advantageous design of the fastening element, it is proposed that the holder have a base body and at least one holding element which is pivotal round an axis formed on the base body. The holding element can be pivoted from a basic position into a locked position. The holding element is connected to the base body in a locking manner in the locked position. This design of the fastening means enables the fastening means to be supplied automatically to a welding device. The fastening means can be supplied pneumatically, as known from the supply of connecting elements in welding devices.

According to a further advantageous design of the fastening means, it is proposed that the axis be formed by at least one journal the cross section of which is smaller than a cross section of at least one articulating bore formed on the holding element, the holding element and the base body being designed such that the articulating bore rests partially on the journal in the locked position. This design of the fastening means enables relatively large holding forces to be introduced through the holding elements into a component which is to be fastened on a structure and which can be, for example, an insulating mat.

According to a further advantageous design, it is proposed that the holder have at least one web which holds the holding element in the basic position. This design also simplifies the fixing, for example, of an insulating mat on a structure as the holding element cannot be forcibly pivoted from its basic position.

According to a further advantageous design, it is proposed that the articulating bore of the holding element be pressed against the journal by the web.

A design of the fastening means in which the web is shaped on the holding element and has a predetermined breaking point at which the web breaks when the holding element is pivoted from the basic position into a locked position is preferred. This design ensures, in particular, that the holding element is not removed from the basic position during rough handling of the fastening means. This design also has the advantage that the fastening means can be supplied to an automatic feeder.

According to a further advantageous design of the fastening means, it is proposed that the holding element be connected to the web in a locking manner in the locked position. The presence of a web is therefore utilised in many respects. The web is used not only to fix the holding element in the basic position but also to fix the holding element in the locked position. The web is preferably resilient in design.

According to a further design of the fastening means, it is proposed that the web be formed in one piece with the base body.

The fastening means is preferably designed such that the holding element extends substantially in the longitudinal direction of the fastening means in the basic position.

BRIEF DESCRIPTION OF DRAWINGS

An embodiment of a method and a fastening means will now be described with reference to the accompanying drawings, in which.

DETAILED DESCRIPTION OF THE INVENTION

Figure 4:
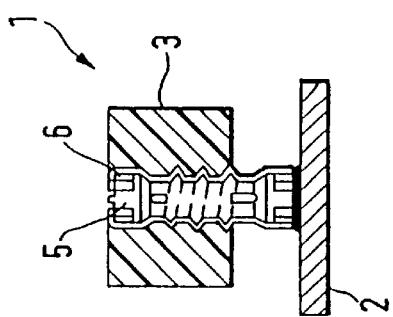
FIGS. 1 to 4 are sequential views of a method of forming a welded joint.

FIGS. 1 to 4 are sequential views of a method of forming a welded joint between a fastening means 1 and a structure 2. The fastening means 1 has a holder 3 which consists of a substantially electrically insulating material, in particular of plastic material. The fastening means 1 also comprises a connecting element 4 which consists of an electrically conductive material. As shown in FIGS. 1 to 4, the holder 3 partially surrounds the connecting element 4.

The holder 3 is shown schematically in FIGS. 1 to 4. It can have various configurations and shapes.

A portion 8 of the connecting element 4 projects from the holder 3, the end face of which connecting element 4 is connected to the structure 2. The connecting element 4 also has, at an end region remote from the portion 8, a contact face 5 which is used to form an electrical contact.

The holder 3 has a through-orifice 6 which at least partially overlaps the contact face 5.

Figure 3:
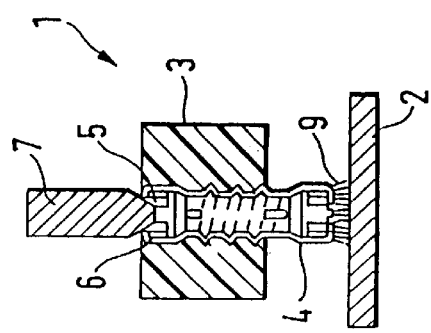
Figure 2:
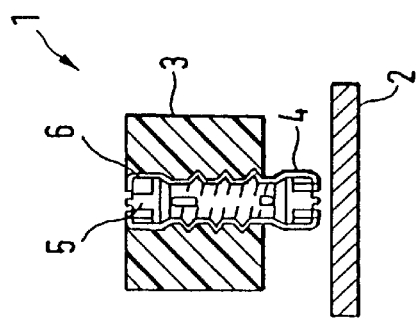
Figure 1:
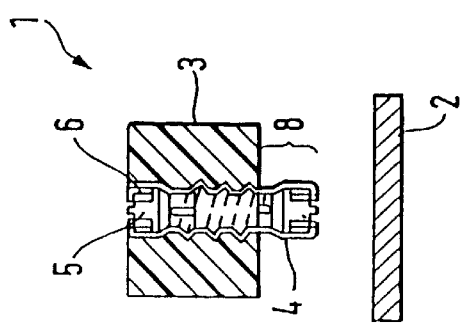

FIG. 1 shows the fastening element 1 in the preassembled state. The holder 3 is already arranged on the connecting element 4. The fastening element 1 is held by a welding device (not shown), and brought into a welding position of the type shown in FIG. 2. The welding device may, for example, be of the type described in U.S. Pat. 5,502,291, the disclosures of which is incorporated herein by reference. The metallic structure 2 is electrically connected to a welding device, in order to form a welded joint by the electric arc welding process. A contact piece 7 is brought into electrical contact with the contact face 5 of the connecting element 4. The contact piece 7 is part of a welding device (not shown). Once the structure 2 and the connecting element 4 have made electrical contact, a welding current is switched on and forms an electric arc 9 between the structure 2 and the connecting element 4, as shown in FIG. 3. The electric arc 9 causes the formation of a molten pool into which the end face of the connecting element 4 is introduced. The welding current is switched off. Once the melt solidifies, a welded joint exists between the fastening means 1 and the structure 2.

Since the through-orifice 6 is designed such that it clears the contact face 5 for the welding process, fastening means with different designs of a holder 3 can be connected. In the illustrated embodiment, the connecting element 4 is tubular in design. The contact face 5 is located within the connecting element 4.

Figure 5:
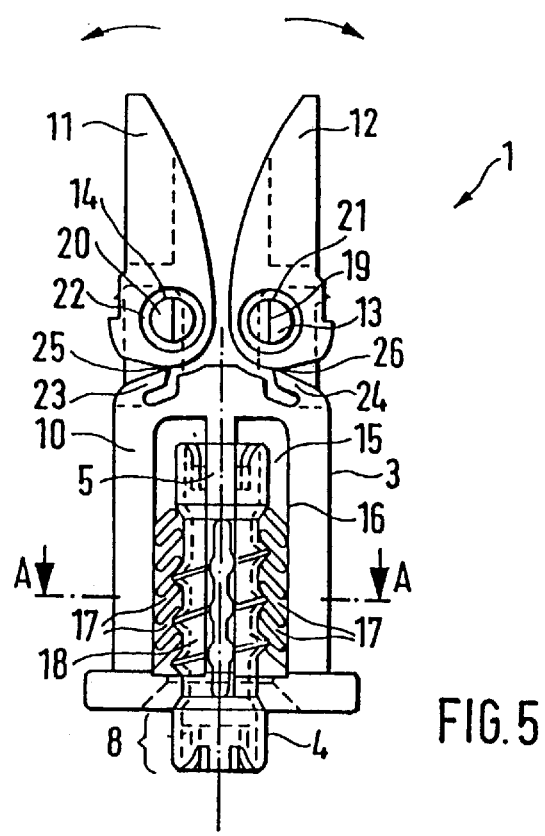
FIG. 5 is a front view of a fastening means.
Figure 6:
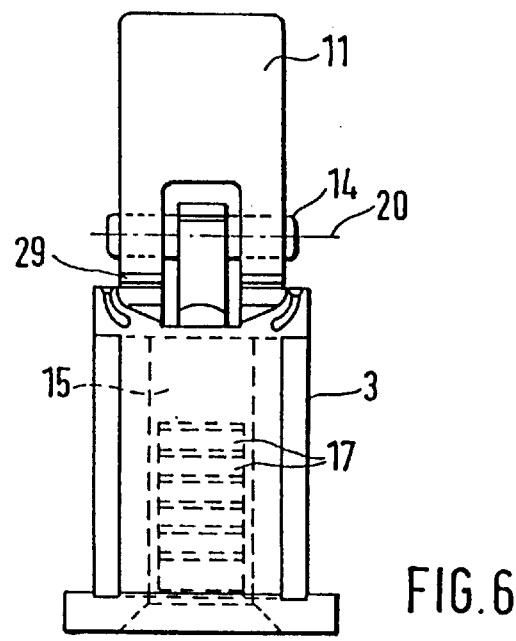
FIG. 6 is a side view, from the left, of the fastening mean according to FIG. 5.
Figure 7:
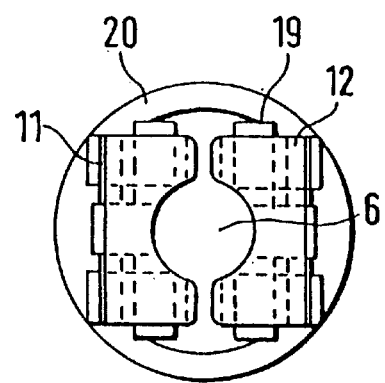
FIG. 7 is plan view of the fastening means according to FIG. 5.
Figure 8:
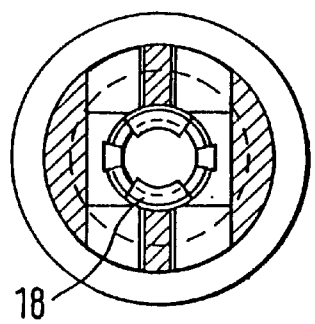
FIG. 8 is a section along section line A—A according to FIG. 5.

FIG. 5 shows a preferred embodiment of a fastening means 1.

The fastening means 1 comprises a holder 3 having a base body 10. The base body 10 has a socket 15 in which the connecting element 4 is arranged. Radially inwardly directed locking fingers 17, which serve to secure the holder 3 against axial removal from the connecting element 4, are provided on the external surface 16 of the socket 15 to connect the base body 10 to the connecting element 4. The connecting element 4 has grooves 18 on its periphery, in which the locking fingers 17 engage. A portion 8 of the connecting element 4 projects from the holder 3. This portion 8 serves to produce a welded joint between the fastening means 1 and a structure. The connecting element 4 is designed substantially in the form of a hollow cylinder.

Figure 9:
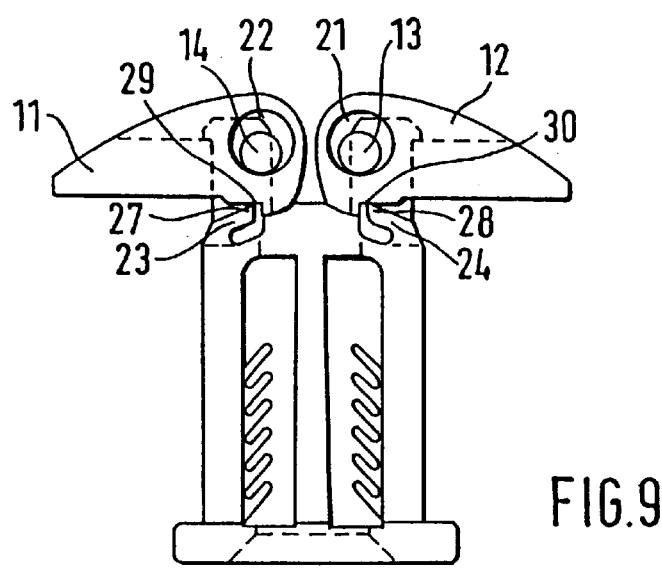
FIG. 9 shows the fastening means according to FIG. 5 with holding elements in a locked position.

Two holding elements 11, 12 are pivotally connected to the base body 10. Each holding element 11, 12 is pivotal round a respective axis 19 or 20. In the embodiment of the fastening means shown in FIG. 5, the holding elements 11, 12 have adopted a basic position. Each holding element 11, 12 can be pivoted from this basic position to a locked position by pivoting in the direction of the arrow, as indicated in FIG. 5. FIG. 9 shows the fastening means 1 with holding elements 11, 12 which are in the locked position.

The axis 19, 20 is physically designed in the form of journals 13, 14. Each holding element 11, 12 has an articulating bore 22, 21. The cross section of the journals 13, 14 is smaller than the cross section of the corresponding articulating bore 21, 22, as shown in particular in FIG. 5.

The holding elements 11, 12 are held in the basic position by webs 23, 24. The webs 23, 24 are formed on the base body 10. They are resilient.

In the embodiment of a fastening means 1 shown in FIG. 5 the webs 23, 24 are shaped on the base body 10 and on the holding element 11 and 12. They each have a set breaking point 25, 26.

If the holding element 11 is transferred from the basic position shown in FIG. 5 into the locked position shown in FIG. 9, the web 23 breaks at the set breaking point 25. The same thing happens when the holding element 12 is transferred from the basic position into the locked position. The web is broken at the set breaking point 26 in this case.

In the locked position shown in FIG. 9, each holding element 12 is connected to the web 24 or 23 in a locking manner. As shown in FIG. 9, an end portion 27 or 28 of the web 23 or 24 projects into a corresponding recess 29 or 30 formed in the holding element 11 or 12.

In FIG. 9, the holding elements 11, 12 have each adopted the locked position. The journal 13 rests on the articulating bore 21 in the locked position. The articulating bore 22 of the holding element 11 rests on the journal 14. The holding element 12 is clamped between the journal 13 and the web 24 and the holding element 11 between the journal 14 and the web 23.

The connecting element 4 has a contact face 5 which serves for making electrical contact with a contact piece 7. The contact face 5 of the connecting element 4 is located within the base body 10 and therefore within the holder 3. To allow contact to be made, the holder 3 has a through-orifice 6. The through-orifice 6 is formed between the spaced journals 13, 14.

What is claimed is:

1. A fastening means (1) for forming a welded joint comprising a holder (3) of substantially electrically insulating material and a connecting element (4) of substantially electrically conducting material, said holder (3) substantially surrounding said connecting element (4) said connecting element (4) having at least one contact face (5) said, holder (3) having at least one through-orifice (6) at least partially aligned with the at least one contact face (5) of the connecting element (4).

2. A fastening means according to claim 1, characterised in that the connecting element (4) comprises a hollow cylinder.

3. A fastening means according to claim 1, wherein said connecting element (4) includes a threaded surface enclosed by said holder (3).

4. A fastening means according to claim 1, wherein said holder (3) is detachably connected to the connecting element (4).

5. A fastening means according to claim 4, characterised in that the holder (3) is connected by interlocking surfaces to the connecting element (4).

6. A fastening means according to claim 1 wherein said holder (3) comprises an electrically insulating material.

7. A fastening means according to claim 5 wherein said holder (3) is injected molded in place on said fastening element.

8. A fastening means according to claim 6, wherein said holder (3) comprises a base body (10) and at least one holding element (11, 12) capable of pivoting round an axis (19, 20) formed on the base body (10) from a basic position into a locked position.

9. A fastening means according to claim 8, characterised in that the axis (19, 20) is formed by at least one journal (13, 14) of which the cross section is smaller than a cross section of at least one articulating bore (21, 22) formed on the holding element (4), and wherein the holding element (4) and the base body (10) are so designed that the articulating bore rests partially on the journal (13, 14) in the locked position.

10. A fastening means according to claim 9, characterised in that the base body (10) has at least one web (23, 24) which holds the holding element (4) in the basic position.

11. A fastening means according to claim 10, characterised in that the wall of the articulating bore (21, 22) of the holding element (4) is pressed partially against the journal (13, 14) by the web (23, 24).

12. A fastening means according to claim 10 characterised in that the web (23, 24) is shaped on the holding element (4)

and on the base body (10) and has a set breaking point (25, 26) at which the web (23, 24) breaks when the holding element (11, 12) is pivoted from the basic position into a locked position.

13. A fastening means according to claim 12, characterised in that the holding element (11, 12) engages the web (23, 24) to hold the element in the locked position.

14. A fastening means according to claim 13, characterised in the that the web (23, 24) is resilient.

15. A fastening means according to claim 10, characterised in that the web (23, 24) is integral with the base body (10).

16. A fastening means according to claim 1, wherein the holding element (11, 12) extends substantially in the longitudinal direction of the fastening element (1) in the basic position.

17. A fastening device adapted to be welded to a metal body for receiving and attaching a separate part to the body, said device comprising a hollow metal stud having an internal contact surface; and an insulative holder mounted on the exterior of said stud, said holder having an aperture aligned with and providing access to the interior of said stud;

said stud and said holder having facing surfaces engaged to retain said holder on said stud, said surfaces being disengageable to permit removal of said holder from said stud;

said stud having an exposed surface disposed for contact with the metal body.

* * * * *